Figure 1:
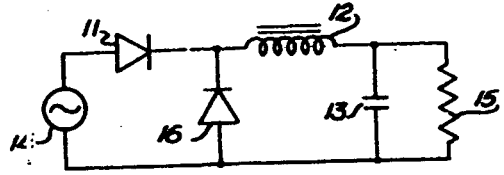

April 6, 1965     G. F. MONTGOMERY     3,177,421
RECTIFIED ALTERNATING-CURRENT CONVERTER
Filed May 10, 1961

INVENTOR
George Franklin Montgomery
BY
ATTORNEY

United States Patent Office 3,177,421
Patented Apr. 6, 1965

3,177,421
RECTIFIED ALTERNATING-CURRENT
CONVERTER
George Franklin Montgomery, Washington, D.C., assignor to the United States of America as represented by the Secretary of Commerce
Filed May 10, 1961, Ser. No. 109,231
3 Claims. (Cl. 321—15)

This invention relates to a rectifier-filter circuit for converting single phase, alternating current to direct current.

Conventional circuits in the prior art, used for this purpose, include the half-wave, full-wave, and bridge rectifier and voltage-doubling rectifier circuits.

In a half-wave rectifier using an inductor input filter, an uninterrupted direct current through the inductor is not maintained, and the smoothing action of the filter is poor and is not improved by increasing the inductance in the circuit. Moreover, the regulation of the load voltage becomes poorer as the inductance is increased, and in practice, this circuit is most often used without the inductor. When this is done, the transient rectifier current may be many times greater than the load current. Because of these effects, a half-wave rectifier circuit has not been available whose smoothing and regulation compare favorably with the smoothing and regulation obtainable in full-wave and in bridge rectifier circuits.

The disadvantage of the conventional full-wave rectifier is the need for a balanced source or, when this source is a transformer, the need for a center-tapped secondary winding. Further, the utilization of the volume occupied by the transformer is relatively poor, for only one-half of its secondary winding is effective in delivering power at a given time. The secondary voltage for the single phase, bridge rectifier circuit for a given load voltage need be only one-half that required for the full-wave rectifier circuit just described, and all the secondary winding is used continuously. However, four rectifiers are needed rather than two. Both circuits are superior to others in that the transient rectifier currents do not exceed the load current when the inductance of the inductor is sufficiently large, and the transformer and the rectifier power losses are thereby kept small.

The voltage-doubling circuit, used most often in practice, is a combination of two half-wave rectifiers. The same limitations on smoothing and regulation therefore apply as in the half-wave rectifier. Moreover, when no filter inductors are used, the transient rectifier currents may be many times greater than the load current with consequent increased heating and power losses.

Accordingly, it is an object of the present invention to provide a half-wave and a voltage-multiplying rectifier circuit in which the full smoothing and regulating advantages of a filter inductor are realized.

Another object is to provide a rectifier circuit requiring only two rectifiers in which a large ratio of load voltage to source voltage is obtained without sacrifice of smoothing and load voltage regulation.

These and other objects are accomplished in a half-wave rectifier circuit by applying the rectified output of an alternating voltage source to a filter circuit, that includes an inductor, in such a manner that current flows through the inductor during each half-cycle of the alternating voltage. Current flow through the rectifier, that supplies current to the inductor, is permitted during one half-cycle and is blocked during the other half-cycle of the alternating voltage. In the voltage-multiplying rectifier circuits, the inductor is provided with two windings and two rectifiers. Each rectifier permits rectified current from the source to flow through a respective one of the windings during alternate half-cycles of the alternating voltage.

Figure 2:
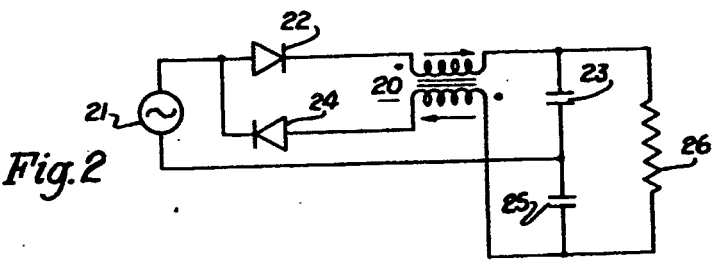
Figure 3:
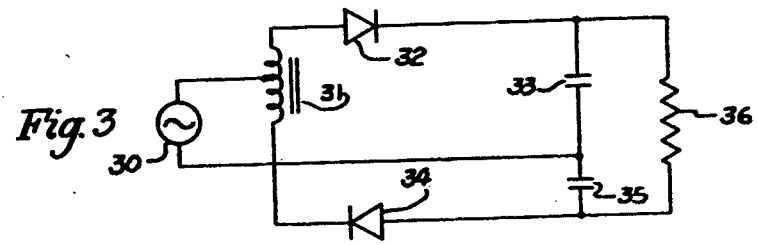
Figure 4:
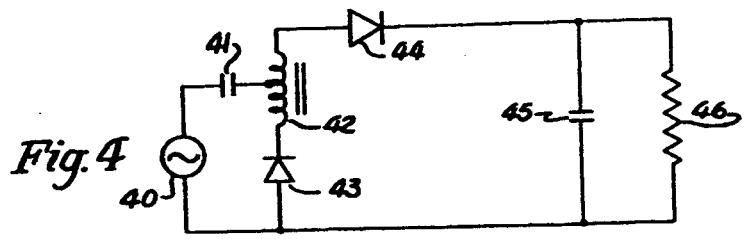

In the figures:
FIG. 1 is a half-wave rectifier circuit;
FIG. 2 is a first voltage-multiplying rectifier circuit;
FIG. 3 is a second voltage-multiplying circuit; and
FIG. 4 is a third voltage-multiplying rectifier circuit, each circuit in the figures employing the inventive concept in the present invention.

Referring to FIG. 1, it is seen that diode 11, inductor 12 and capacitor 13 form a conventional half-wave rectifier circuit connected across alternating current source 14. Load resistor 15 is positioned across the output, and diode 16 is positioned across the input of the filter, which comprises inductor 12 and capacitor 13. The addition of diode 16 to the known circuit modifies this circuit fundamentally.

In a conventional half-wave rectifier, the direct output voltage is the average of the alternating voltage applied to the filter superimposed on a D.C. component over the interval during which the diode conducts. The conduction interval is dependent upon the relationship between the magnitude and phase of the alternating voltages appearing across the output of the source and the input of the filter, i.e., the voltages appearing across the anode and cathode of the diode. As the inductance of the filter-inductor is increased, the conduction interval becomes a larger fraction of the cycle of the alternating source voltage. If the inductance were made infinite, the conducting interval would be equal to the period of the source voltage, and at no time during its cycle would the diode be cut off. In this case, since the average of the source voltage is zero, the direct output voltage of the filter would be zero. Thus, when the inductance of the inductor is small, the direct output voltage has a magnitude that is comparatively large; as the inductance is made continuously greater, the direct output voltage decreases for a given load current.

In contrast, in the arrangement in FIG. 1, diode 16 prevents the input voltage to the filter, comprising inductor 12 and capacitor 13, from ever going negative because as soon as the input voltage goes negative, the diode conducts and the cathode is held at the potential of the common terminal of source 14. Consequently, when the alternating voltage of source 14 goes negative, diode 16 begins to conduct and diode 11 is cut off. The direct output voltage appearing across load resistor 15 is then the average of the positive half-cycle only, of the input voltage to the filter plus a period of time when the input voltage is zero. Since there is no negative voltage contribution by source 14 to the average voltage appearing at the input of the filter for a given inductance of inductor 12, the average direct output voltage of the filter has a greater magnitude than when a conventional half-wave rectifier circuit is used.

Another advantage of the circuit in FIG. 1 is that direct current can be maintained in inductor 12 throughout the period of alternation of the potential provided by source 14. During the positive half-cycle of the source potential, current flows through inductor 12 and diode 11; during the negative half-cycle, current flows through the inductor and diode 16 in the same direction. Thus, the full smoothing and regulating advantages of the inductor are realized.

If the voltage of source 14 is sinusoidal and of root-mean-square amplitude E, analysis of the energy balance of the circuit shows that the voltage appearing across load resistor 15 is $(\sqrt{2}/\pi)E = 0.45E$, provided the resistances of diode 11 and inductor 12 are negligible and the inductance of inductor 12 is sufficiently large.

Referring to the voltage-multiplying circuit in FIG. 2, inductor 20 comprises two equal windings such that a certain magnetic flux is established in the magnetic path of the inductor by a given current in either winding but not in both. The arrows in FIG. 2 indicate the current directions through the windings such that the same flux is established by either current. The current delivered by alternating current source 21 remains constant in amplitude but reverses direction with the cyclic change in source potential. When the source potential is positive, current flows through diode 22, the upper winding of inductor 20, and capacitor 23; when the source potential is negative, current flows through diode 24, the lower winding of inductor 20 and capacitor 25. Thus, current is delivered to the upper winding of inductor 20 when the source potential is positive and is withdrawn from the lower winding when the source potential is negative.

During the time when the potential of source 21 is positive, diode 22 conducts current through the top winding of inductor 20. At the instant when the source potential is changing polarity from positive to negative, the tendency would ordinarily be for the terminal of inductor 20, connected to the cathode of diode 22, to follow the potential applied to the anode in the negative direction. This is prevented, however, because a positive potential is generated across the lower winding of inductor 20 so that diode 24 begins to conduct. As soon as this occurs, the potential of the terminal of the top winding of 20, connected to diode 22, also goes positive and thus, diode 22 is cut off and diode 24 is cut on. Turning diode 24 on reinforces the cut off of diode 22.

If the potential of source 21 is sinusoidal, and of root-mean-square amplitude E, analysis of the energy balance of the circuit shows that the load voltage is $$(4\sqrt{2}/\pi)E = 1.8E$$

provided the resistances of diodes 22, 24 and inductor 20 are negligible and the inductance of the inductor is sufficiently large.

Referring to FIG. 3, when the potential of alternating current source 30 is positive, current flows through the upper portion of center-tapped inductor 31, diode 32, and capacitor 33; when the source potential is negative, current flows through the lower portion of inductor 31, diode 34, and capacitor 35. Thus, current is delivered to the upper half of the winding of inductor 31 when the source potential is positive and is withdrawn from the lower half of the winding of inductor 31 when the source potential is negative. Diodes 32, 34 are switched on and off in the manner indicated above for diodes 22, 24, in FIG. 2. Again, as in FIG. 2, if the source potential is sinusoidal and of root-mean-square amplitude E, a load voltage appearing across resistor 36 is $(4\sqrt{2}/\pi)E=1.8E$, provided the resistances of diodes 32, 34 and inductor 31 are negligible and the inductance of inductor 31 is sufficiently large.

Referring to FIG. 4, when the top terminal of alternating current source 40 is negative with respect to the bottom terminal, capacitor 41 is charged negatively by means of current flowing through inductor 42 and diode 43. On the next half-cycle, the negative charge across capacitor 41, the negative terminal of capacitor 41 being connected to source 40, appears as a positive source to diode 44. On this half-cycle, therefore, the charge on capacitor 41 adds to the potential of the source to produce current flow through diode 44 into capacitor 45. Load resistor 46 is connected across the latter capacitor.

It is apparent that current is delivered to the upper half of the winding of inductor 42 when the potential of source 40 is positive and is withdrawn from the lower half of the winding when the source potential is negative. Diodes 43, 44 are switched on and off in the same manner as diodes 32, 34 in FIG. 3. Again, if the potential of source 40 is sinusoidal and of root-mean-square amplitude E, the voltage appearing across resistor 46 is $(4\sqrt{2}/\pi)E=1.8E$, provided the resistance of diodes 43, 44 and inductor 42 are negligible and the inductance of inductor 42 is sufficiently large.

What is claimed is:

1. In a rectifier circuit, a source of alternating voltage having a first and second output terminal, an inductor having a first and second winding, a first rectifier connected between the first terminal of said source and one end of said first winding, a capacitor connected between the other end of said first winding and the second terminal of said source, a second rectifier connected between the first terminal of said source and one end of said second winding, a capacitor connected between the other end of said second winding and the second terminal of said source, said first and second rectifier being positioned to conduct current during the first and second half-cycle, respectively, of said alternating voltage, and said first and second winding being wound and positioned in such a manner that the magnetic flux established by one winding reinforces the magnetic flux established by the other winding.

2. In a rectifier circuit, a source of alternating voltage having a first and second output terminal, an inductor including a winding and a tap positioned on said winding, means connecting the first terminal of said source to said tap, a first and second rectifier, each having a first and second terminal, means for connecting the first terminal of each rectifier to a respective end of said winding, a first and second capacitor connected between the second terminal of said first and second rectifier, respectively, and the second terminal of said source, said first and second rectifier being positioned to conduct current during the first and second half-cycle, respectively, of said alternating voltage, and the portions of the winding on each side of said tap being wound and positioned in such a manner that the magnetic flux established by one portion reinforces the magnetic flux established by the other portion.

3. In a rectifier circuit, a source of alternating voltage having a first and second output terminal, an inductor including a winding and a tap positioned on said winding, a capacitor connected between the first terminal of said source and said tap, a first and second rectifier, each having a first and second terminal, means for connecting the first terminal of each rectifier to a respective end of said winding, means for connecting the second terminal of said first rectifier to the second terminal of said source, a capacitor connected between the second terminal of said second rectifier and the second terminal of said source, said first and second rectifier being positioned to conduct current during the first and second half-cycle, respectively, of said alternating voltage, and the portion of the winding on each side of said tap being wound and positioned in such a manner that the magnetic flux established by one portion reinforces the magnetic flux established by the other portion.

References Cited by the Examiner

UNITED STATES PATENTS

| 1,758,680 | 5/30 | Andre | 321—10 |
| 1,766,051 | 6/30 | Ackerly | 321—10 |
| 1,929,057 | 10/33 | Dellenbaugh | 321—10 |
| 2,597,310 | 5/52 | Fisher. | |

OTHER REFERENCES

Electronic Circuit Theory, Zimmermann & Mason, second printing, March 1960, copyright 1959.

LLOYD McCOLLUM, *Primary Examiner.*